US009574122B2

(12) United States Patent
Gignac et al.

(10) Patent No.: US 9,574,122 B2
(45) Date of Patent: Feb. 21, 2017

(54) PROCESS FOR REDUCING THE CONTENT OF WATER SOLUBLE VOLATILE ORGANIC COMPOUNDS IN A GAS

(75) Inventors: Pierre-André Gignac, Saint-Jérôme (CA); Martin Beaulieu, Sainte-Foy (CA); Yves Charest, Ancienne-Lorette (CA); Stéphane Chabot, Lévis (CA); Abderrahman Mahfoud, Charny (CA); Jules Lemay, Victoriaville (CA)

(73) Assignees: Uniboard Canada Inc., Laval (CA); EXP Services Inc., Brampton (CA)

(*) Notice: Subject to any disclaimer, the term of this patent is extended or adjusted under 35 U.S.C. 154(b) by 140 days.

(21) Appl. No.: 12/760,321

(22) Filed: Apr. 14, 2010

(65) Prior Publication Data
US 2010/0258428 A1 Oct. 14, 2010

Related U.S. Application Data

(60) Provisional application No. 61/169,234, filed on Apr. 14, 2009.

(51) Int. Cl.
*B01J 19/12* (2006.01)
*B01J 37/34* (2006.01)
(Continued)

(52) U.S. Cl.
CPC ............... *C09K 3/32* (2013.01); *B01D 53/72* (2013.01); *B01D 53/78* (2013.01); *B01J 19/123* (2013.01);
(Continued)

(58) Field of Classification Search
CPC ........... C09K 3/32; B01D 53/78; B01D 53/72; B01D 2255/20738; B01D 2255/802; B01D 2257/708; B01D 2251/106; B01D 2259/804; B01J 19/123; B01J 37/345
(Continued)

(56) References Cited

U.S. PATENT DOCUMENTS 3,509,217 A * 4/1970 Freyermuth ............... 568/37
4,002,722 A 1/1977 Suzuki et al.
(Continued)

FOREIGN PATENT DOCUMENTS

CA 2178258 12/1996
CA 2527450 12/2008
(Continued)

OTHER PUBLICATIONS

Zepp et al, "Hydroxyl Radical Formation in Aqueous Reactions (pH 3-8) of Iron(II) with Hydrogen Peroxide: The Photo-Fenton Reaction," Environ. Sci. Technol. 1992, vol. 26, No. 2, 1992, pp. 313-319.*
(Continued)

*Primary Examiner* — Keith Hendricks
*Assistant Examiner* — Colleen M Raphael
(74) *Attorney, Agent, or Firm* — Bereskin & Parr LLP/S.E.N.C.R.L., s.r.l.

(57) ABSTRACT

There is provided a method for reducing the content of at least one water soluble volatile organic compound in a gas. The method comprises contacting the gas with an aqueous acidic oxidizing composition comprising $H_2O_2$ and a metal catalyst, and submitting the at least one water soluble volatile organic compound and the aqueous acidic oxidizing composition to an UV radiation.

34 Claims, 3 Drawing Sheets

(51) Int. Cl.
  *B01D 53/72* (2006.01)
  *B01D 53/78* (2006.01)
  *C09K 3/32* (2006.01)

(52) U.S. Cl.
  CPC ........ *B01J 37/345* (2013.01); *B01D 2251/106* (2013.01); *B01D 2255/20738* (2013.01); *B01D 2255/802* (2013.01); *B01D 2257/708* (2013.01); *B01D 2259/804* (2013.01)

(58) Field of Classification Search
  USPC .............................. 204/157.3; 422/186.3, 24
  See application file for complete search history.

(56) References Cited

U.S. PATENT DOCUMENTS

| | | | |
|---|---|---|---|
| 4,079,118 A | | 3/1978 | Gorai |
| 4,104,162 A | | 8/1978 | Junkermann et al. |
| 4,319,055 A | | 3/1982 | Rebafka et al. |
| 4,780,287 A | * | 10/1988 | Zeff et al. ................. 204/157.3 |
| 4,880,609 A | | 11/1989 | Naraghi |
| 5,207,877 A | | 5/1993 | Weinberg et al. |
| 5,248,395 A | * | 9/1993 | Rastelli .................. B01D 53/70 210/664 |
| 5,266,214 A | * | 11/1993 | Safarzedeh-Amiri ... 210/748.09 |
| 5,364,599 A | | 11/1994 | Lee |
| 5,480,524 A | * | 1/1996 | Oeste ........................ 204/157.3 |
| 5,527,517 A | | 6/1996 | Bridges et al. |
| 5,762,808 A | * | 6/1998 | Peyton ..................... 210/748.04 |
| 5,907,066 A | | 5/1999 | Wachs |
| 5,914,305 A | * | 6/1999 | Madison et al. ............. 510/367 |
| 5,919,982 A | * | 7/1999 | Whittaker et al. ............ 564/437 |
| 6,207,120 B1 | | 3/2001 | Belmonte et al. |
| 6,277,344 B1 | | 8/2001 | Hei et al. |
| 6,315,963 B1 | * | 11/2001 | Speer ........................ 422/186.3 |
| 6,384,184 B1 | | 5/2002 | Ruesse |
| 6,391,099 B1 | | 5/2002 | Ina et al. |
| 6,406,616 B1 | | 6/2002 | Rappas et al. |
| 6,410,793 B1 | | 6/2002 | Wachs |
| 6,503,471 B1 | | 1/2003 | Han et al. |
| 6,518,477 B2 | | 2/2003 | Soundararajan |
| 6,521,809 B1 | * | 2/2003 | Smith et al. .................... 588/20 |
| 6,531,634 B1 | | 3/2003 | Zhu |
| 6,770,174 B1 | | 8/2004 | Richards et al. |
| 6,774,277 B2 | | 8/2004 | Fisher |
| 6,930,072 B2 | | 8/2005 | Wachs et al. |
| 7,304,187 B2 | | 12/2007 | Chabot et al. |
| 7,550,123 B2 | * | 6/2009 | Temple et al. .................... 422/4 |
| 2001/0043898 A1 | * | 11/2001 | Stoltz et al. ............... 423/245.2 |
| 2002/0130030 A1 | * | 9/2002 | Kato ..................... B01D 53/70 204/157.15 |
| 2005/0139554 A1 | | 6/2005 | Clark |
| 2005/0178733 A1 | * | 8/2005 | Conger et al. ................. 210/760 |
| 2005/0187124 A1 | | 8/2005 | Li et al. |
| 2005/0274623 A1 | * | 12/2005 | Soler Turu et al. .......... 205/340 |
| 2006/0217286 A1 | * | 9/2006 | Geoffroy et al. ............. 510/490 |
| 2007/0059229 A1 | | 3/2007 | Temple et al. |
| 2007/0081933 A1 | | 4/2007 | Chabot et al. |
| 2011/0189049 A1 | * | 8/2011 | Beaulieu ............... B01D 53/44 422/5 |

FOREIGN PATENT DOCUMENTS

| | | | |
|---|---|---|---|
| DE | 19607389 A1 | * | 9/1997 |
| EP | 1206906 | | 5/2002 |
| WO | 99/36160 A1 | | 7/1999 |
| WO | 00/15734 | | 3/2000 |
| WO | 02/07860 A2 | | 1/2002 |
| WO | 2004/030797 A1 | | 4/2004 |
| WO | 2007/041831 A1 | | 4/2007 |
| WO | WO 2008142724 A1 | * | 11/2008 ............... C02F 1/32 |

OTHER PUBLICATIONS

Kajitvichyanukul et al, "Formaldehyde degradation in the presence of methanol by photo-Fenton process," J. of Environ. Mgmt. 86 (2008), pp. 545-553.*

Pignatello et al, "Advanced Oxidation Processes for Organic Contaminant Destruction Based on the Fenton Reaction and Related Chemistry," Critical Reviews in Environmental Science and Technology, 36:1-84, 2006.*

Kwan et al, "Transformation of 2,4-dichlorophenoxyethanoic acid (2,4-D) by a photoassisted ferrous oxalate/H2O2 system," J. Chem. Technol. Biotechnol. vol. 79, pp. 663-669 (May 6, 2004).*

Arana et al, "Highly concentrated phenolic wastewater treatment by the Photo-Fenton reaction, mechanism study by FTIR-ATR," Chemosphere vol. 44 (2001) pp. 1017-1023.*

McGinnis et al, "Degradation of ethylene glycol in photo Fenton systems," Wat. Res. vol. 34, No. 8, pp. 2346-2354, 2000.*

Litter, "Heterogeneous photocatalysis: Transition metal ions in photocatalytic systems," Applied Catalysis B: Environmental 23 (1"99) pp. 89-114.*

Walling, "Fenton's Reagent Revisited," Accounts of Chemical Research vol. 8, 1975, pp. 125-131.*

Tudorache et al, "Advanced purification of wastewater of the cellulose and paper industry by Fenton-type oxidation processes," Studii si Cercetari Scientificie: Chimie si Inginerie Chimica, Biotechnologi, Industrie Alimentara, vol. 7, issue 2, pp. 337-348 (2006).*

Tudorache et al, "Advanced purification of wastewater of the cellulose and paper industry by Fenton-type oxidation processes," Studii si Cercetari Scientificie: Chimie si Inginerie Chimica, Biotechnologi, Industrie Alimentara, vol. 7, issue 2, pp. 337-348 (2006) (translation).*

Ferrero, "Oxidative degradation of dyes and surfactant in the Fenton and photo-Fenton treatment of dyehouse effluents," Journal of the Society of Dyes and Colourists, vol. 113, May/Jun. 2000, pp. 148-153.*

International Search Report of PCT/CA2010/000589; James McCarthy Jul. 9, 2010.

English Abstract of JP55056820, published on Apr. 26, 1980.

English Abstract of De 197 53 117, published on Jun. 18, 1998.

* cited by examiner

PROCESS FOR REDUCING THE CONTENT OF WATER SOLUBLE VOLATILE ORGANIC COMPOUNDS IN A GAS

CROSS-REFERENCE TO RELATED APPLICATION

The present application claims priority on U.S. provisional application No. 61/169,234 filed on Apr. 14, 2009, which is hereby incorporated by reference in its entirety.

FIELD OF THE DISCLOSURE

The present disclosure relates to the field of gas treatment so as to reduce their pollutants and/or impurities content. In particular, this disclosure relates to a process for reducing the water soluble volatile organic compounds content of a gas. The disclosure also relates to an aqueous acidic composition.

BACKGROUND OF THE DISCLOSURE

It is nowadays a major concern to considerably reduce the emission of various pollutants in the environment. Volatile organic compounds (VOCs) such as formaldehyde and methanol are some of the products that several industries must treat so as to avoid releasing them to the atmosphere. For example, gases containing such products may be generated in the wood or pulp and paper industries. These gases can be generated during the production of wood-based panel products such as oriented strand boards (OSB), or fibreboards such as low density fibreboards (LDF), medium density fibreboard (MDF) or high density fibreboards (HDF) and particle boards. In various other types of industries, such gases emissions containing VOCs are encountered. Such industries include foundries, smelters, petrochemical industries, sugar industries, dental care products industries, polymer industries automotive industries paint industries, glassware industries and mineral wool industries.

Among the technologies proposed so far there is RTO (Regenerative Thermal Oxidizer). However, it has been demonstrated that such a technology can be very costly to install in a plant, and high maintenance fees may be required to operate it. Moreover, such a technology can generate important amounts of smog precursors, which is undesirable from an environmental point of view. RTO relies on thermal oxidization to destroy these emissions. For example, in the wood-based panel industry, dryer or press gases are sent to the RTO where the VOCs (such as formaldehyde, methanol, ethanol, pinenes, limonenes, camphenes, ketones, etc.) are incinerated at very high temperatures of about 800° C. To increase the thermal efficiency of the system, ceramic beds are used to preheat the inlet air prior to combustion. This technology can be effective in the destruction of VOCs, CO and organic particulate. However, RTOs do generate some NOx (smog precursors) and green house gases (GHG) from the combustion of natural gas and other fossil fuels to generate the required temperatures. RTOs are fairly expensive to operate and require a source of fossil fuel. Moreover, inorganic particulate may cause bed fouling. RTOs operate at or close to the melting point of some of these inorganic particulate and once melted, these by-products can permanently adhere to the ceramic bed and cause premature bed failure. Occasional bed burn-out is required to clear the bed of organic particulate and reduce pressure drops. Additional inorganic particulate devices may be required upstream of the RTO.

Bio-filtration is sometimes used for the capture and destruction of particulates and VOCs. Some mesophilic micro-organisms can be well suited for the destruction of easily degradable VOCs. However, such a technology requires high installation costs and a large surface area. Furthermore, since mesophilic micro-organisms are used, there is a limitation in gas stream temperature which requires dilution with ambient air. This results in larger required area. Such a technology also requires very stable operating conditions.

SUMMARY OF THE DISCLOSURE

According to one aspect, there is provided a method for reducing the content of at least one water soluble volatile organic compound present in a gas, the method comprising contacting the gas with an aqueous acidic oxidizing composition comprising $H_2O_2$ and a metal catalyst and submitting the at least one water soluble volatile organic compound and the aqueous acidic oxidizing composition to an UV radiation.

It has been found that such method is particularly useful for considerably reducing the amount of various water soluble VOCs in a gas. It has also been found that such a method can be carried out simply and at low costs when compared to the prior art proposed technologies.

According to another aspect, there is provided an aqueous acidic composition comprising $H_2O_2$, a metal catalyst, and a sequestering agent chosen from oxalic acid, citric acid, EDTA (ethylenediaminetetraacetic acid), glycine, NTA (nitrilotriacetic acid), salicylic acid, sulfosalicylic acid, triethylenetetramine, and mixture thereof.

According to another aspect, there is provided the use of a composition as defined in the present document for reducing the content of at least one water soluble volatile organic compound in a gas by at least partially oxidizing the at least one water soluble volatile organic compound.

According to another aspect, there is provided a method for using a composition as defined in the present document. The method comprises contacting the composition with a gas comprising at least one water soluble volatile organic compound so as to reduce a content of the at least one water soluble volatile organic compound in the gas.

It has been found that such an aqueous acid composition can be useful for oxidizing various VOCs present in a gas.

BRIEF DESCRIPTION OF THE DRAWINGS

In the appended drawings which represent various examples.

DETAILED DESCRIPTION OF THE DISCLOSURE

Figure 1:
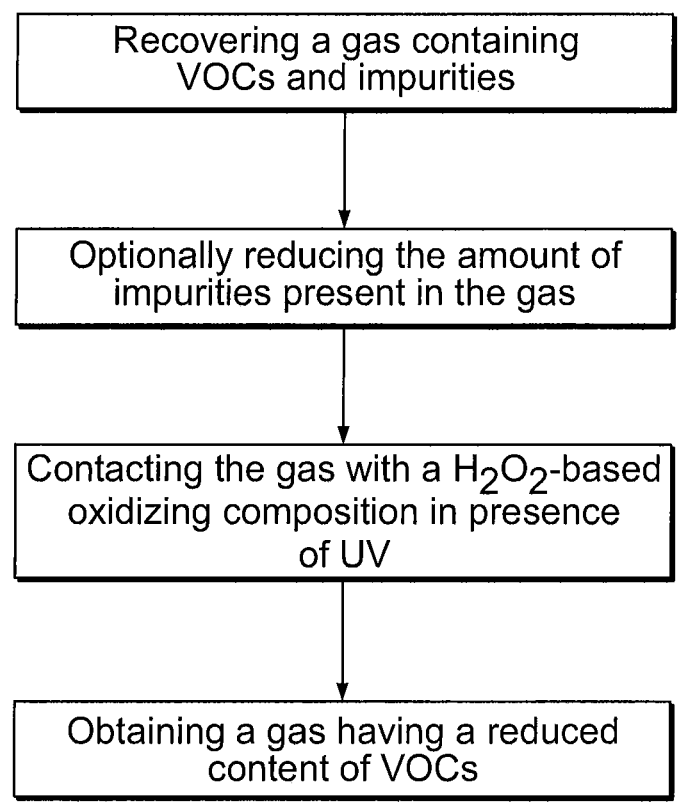
FIG. 1 shows a bloc diagram of a method according to an example of the present disclosure.

The expression "water soluble volatile organic compound" as used herein refers, for example, to a volatile organic compound that is at least partially soluble in water. For example, such a compound can be chosen from alcohols, aldehydes, ketones, pinenes, limonenes, camphenes, organic acids, esters, and mixtures thereof.

The expression "sequestering agent" as used herein includes chemical moieties that bind to, or complex with cations or anions. Examples of sequestering agents or chelators are well known in the art. For example, the sequestering agent binds to a metal cation.

The expression "absorption tower" as used herein refers to an absorption tower which is used so as to increase contact between a gas and a liquid. For example, such an absorption tower is used for at least partially removing at least one VOC from a gas stream by absorbing it or dissolving it into a liquid such as an oxidizing composition. Such a tower can have a predetermined number of transfer units. For example, such an absorption tower can be a packed column.

The term "about" as used herein means a reasonable amount of deviation of the modified term such that the end result is not significantly changed. For example, "about" should be construed as including a deviation of at least ±5% of the modified term if this deviation would not negate the meaning of the word it modifies.

The composition can have a pH of about 1.5 to about 3.5, about 1.8 to about 3.2, or about 2.0 to about 3.0. The pH can also be about 1.8 to about 2.2 or about 2.2 to about 2.6.

The metal catalyst can comprise a metal chosen from Fe, Cu, Ni, Mn, Ti, Cr, Ce, Zn, Pd, Mo, and mixtures thereof. For example, the metal catalyst can comprise Fe, Cu or a mixture thereof. For example, the metal catalyst can comprise $Fe^{2+}$ ions.

The composition can further comprise a sequestering agent. For example, the sequestering agent can be chosen from oxalic acid, citric acid, EDTA (ethylenediaminetetraacetic acid), glycine, NTA (nitrilotriacetic acid), salicylic acid, sulfosalicylic acid, triethylenetetramine, and mixtures thereof. According to one embodiment, the sequestering agent is oxalic acid.

The molar ratio sequestering agent:metal catalyst can be about 2:1 to about 6:1.

The metal catalyst concentration can be at least 5 mg/L or at least 10 mg/L, based on the total volume of the composition. The metal catalyst concentration can also be about 10 mg/L to about 50 mg/L or about 30 mg/L to about 50 mg/L.

The molecular ratio $H_2O_2$:metal catalyst can be at least 5:1 or at least 10:1. For example, the molecular ratio $H_2O_2$:metal catalyst can be about 10:1 to about 100:1 or about 12:1 to about 40:1.

The gas to be treated can have a temperature of about 20° C. to about 75° C. or about 35° C. to about 55° C.

For example, in the method for using a composition as defined in the present document, the composition and the at least one water soluble volatile organic compound can react together in the presence of UV radiation.

For example, the gas can contact the composition in an absorption tower. According to one embodiment, the absorption tower can comprise at least two transfer units.

According to one embodiment, contacting can include mixing the gas with the aqueous acidic oxidizing composition so as to at least partially dissolve the at least one water soluble volatile organic compound in the aqueous acidic oxidizing composition.

For example, the gas can be introduced at a bottom portion of an absorption tower and the aqueous acidic oxidizing composition can be introduced at an upper portion of the tower with respect to the gas. The gas and the aqueous acidic oxidizing composition can be mixed together into the tower over a predetermined amount of transfer units.

For example, after the contacting, the aqueous acidic oxidizing composition having at least a portion of the at least one water soluble volatile organic compound dissolved therein can be transferred in a tank in which the aqueous acidic oxidizing composition and at least a portion of the at least one water soluble volatile organic compound are submitted to an UV radiation.

According to one embodiment, the gas can contact the aqueous acidic oxidizing composition (for example in a tank) so as to at least partially dissolve the at least one water soluble volatile organic compound in the aqueous acidic oxidizing composition and the aqueous acidic oxidizing composition having at least a portion of the at least one water soluble volatile organic compound dissolved therein is submitted to an UV radiation. For example, the contacting and the submitting to UV radiation can be carried out simultaneously. Alternatively, the contacting can be carried out and then the submitting to UV radiation is carried out.

For example, the gas can be mixed with the aqueous acidic oxidizing composition so as to obtain a mixture and the mixture can be submitted to the UV radiation. The mixing and submitting to UV radiation can be carried out simultaneously. Alternatively, the mixing is carried out and then the submitting to UV radiation is carried out.

The gas and the composition can be mixed together so as to at least partially dissolved the at least one water soluble volatile organic compound in the composition and obtaining the mixture, the gas being at least partially removed from the mixture. For example, the gas can be removed from the mixture by means of a vacuum pump.

For example, the UV radiation can have an energy of at least 1000, 2000, 3000, 4000, or 5000 kJ per kg of the at least one water soluble volatile organic compound contained in the gas. It should be noted that when more than one compound is present in the gas i.e. a mixture of at least two water soluble volatile organic compounds, this value is given per kg of such a mixture. Alternatively, the energy of the UV radiation can be about 1000 to about 60000, about 2000 to about 45000, about 3000 to about 30000, about 3500 to about 25000, about 4000 to about 22000, about 5000 to about 10000, or about 6000 to about 9000 kJ per kg of the at least one water soluble volatile organic compound contained in the gas.

The at least one water soluble volatile organic compound can be chosen from alcohols, aldehydes, ketones, pinenes, limonenes, camphenes, organic acids (such as carboxylic acids), esters, and mixtures thereof. For example, the gas can comprise at least one water soluble volatile organic compound chosen from methanol, formaldehyde, ethanol, acetaldehyde, acrolein, acetic acid, formic acid, ethyl acetate, phenol, fatty acids and mixtures thereof. For example, the gas can comprise methanol and formaldehyde. For example, the gas can comprise methanol.

For example, the aqueous acidic oxidizing composition can comprise an acid chosen from $H_2SO_4$, HCl, $HNO_3$, $H_3PO_4$, and mixtures thereof. According to one embodiment, the aqueous acidic oxidizing composition can comprise $HNO_3$.

The methods of the present document can permit to reduce at least about 75, 80, 85, 90, 91, 92, 93, 94, 95, 96, 97, 98 or 99% of the content of the at least one water soluble volatile organic compound present in the gas. For example, these methods can be effective to reduce about 80.0 to about 99.9%, about 85.0 to about 99.9%, about 90.0 to about 99.9%, about 90.0 to about 99.5%, about 85.0 to about 99.5%, about 80.0 to about 99.5%, about 90.0 to about 99.0%, about 90.0 to about 98.0%, about 85.0 to about 98.0%, about 80.0 to about 98.0%, about 90.0 to about 97.0%, about 85.0 to about 97.0%, about 80.0 to about 97.0%, about 95.0 to about 99.5%, about 95.0 to about 99.0%, about 95.0 to about 98.0%, or about 95.0 to about 98.0% of the content of the at least one water soluble volatile organic compound present in the gas.

As it can be seen from FIG. 1, such a process is relatively simple and it can be carried out easily without requiring tedious tasks. When the volatile organic compound(s)-containing gas to be treated also contains impurities, such as particulate material (for example wood particles), it is possible to remove the impurities. After such a primary treatment, the gas can be contacted with an oxidizing composition comprising $H_2O_2$. This treatment permits to at least oxidize partially in presence of UV at least one water soluble volatile organic compound, thereby reducing the amount of volatile organic compounds present in the gas.

Figure 2:
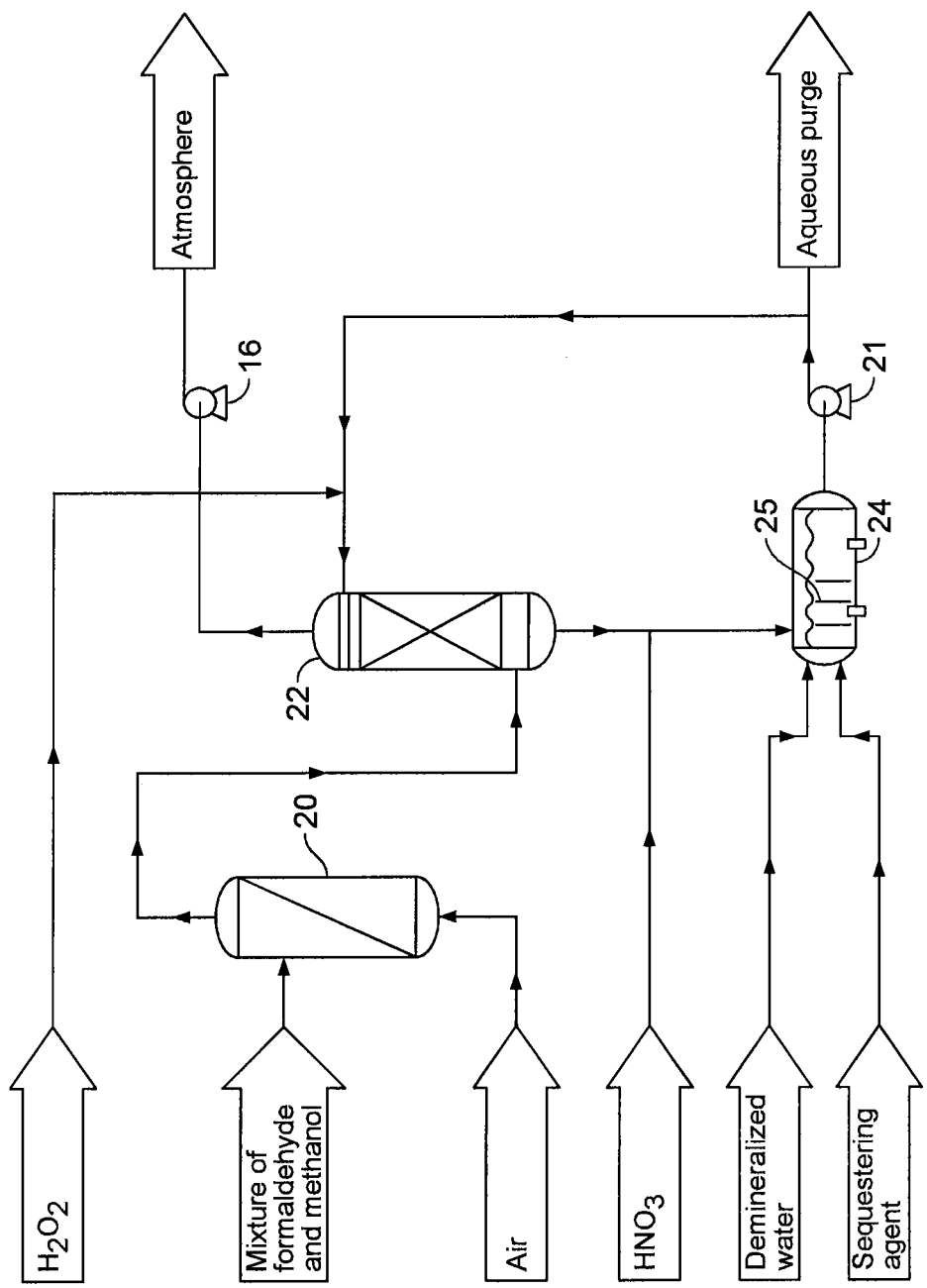
FIG. 2 is a schematic representation illustrating how is carried out a method according to another example of the present disclosure.

As shown in FIG. 2, air coming from ambient is mixed with a composition comprising formaldehyde and methanol in a mixing flask (20) to ensure the complete evaporation and mixing of these water soluble volatile organic compounds.

The gas goes then into an absorption tower (22). In the tower (22), the gas and an aqueous acidic oxidizing composition, previously prepared in a reaction tank (24), are contacted together so as to enhance dissolution of formaldehyde and methanol in the oxidizing composition and therefore their oxidation rates into reaction products. The circulation of the gas into the system is done by the use of a vacuum pump (16).

The composition is firstly prepared in the tank (24) by adding and mixing therein demineralised water, an acid (for example $HNO_3$), a metal catalyst (for example Fe) and a sequestering agent (for example oxalic acid). The composition is brought to an upper part of tower (22) by means of a pump (21). Before the composition reaches the tower (22), an oxidizing agent, $H_2O_2$, is added to the composition. Thus, the so-obtained composition reacts, in the presence of UV emitted by UV lamps (25) in the tank (24), with formaldehyde and methanol of the gas as previously defined. During the oxidation reaction various compounds can be formed. For example, when the compounds mainly present in the gas are methanol and formaldehyde, the obtained oxidation product will be $CO_2$ and it will eventually be removed by means of the vacuum pump (16).

The pH in the tank can be maintained at a pH of about 1.8 to 3.2. The composition is thus continuously recirculated into the tower (22). To avoid the build-up of reaction products after a certain time, a part of the oxidizing composition can be purged by means of the pump (21). To replace such an amount of purged oxidizing composition, some more demineralised water, acid, metal catalyst and a sequestering agent can be added to the tank (24). Some more $H_2O_2$ can also be added.

Figure 3:
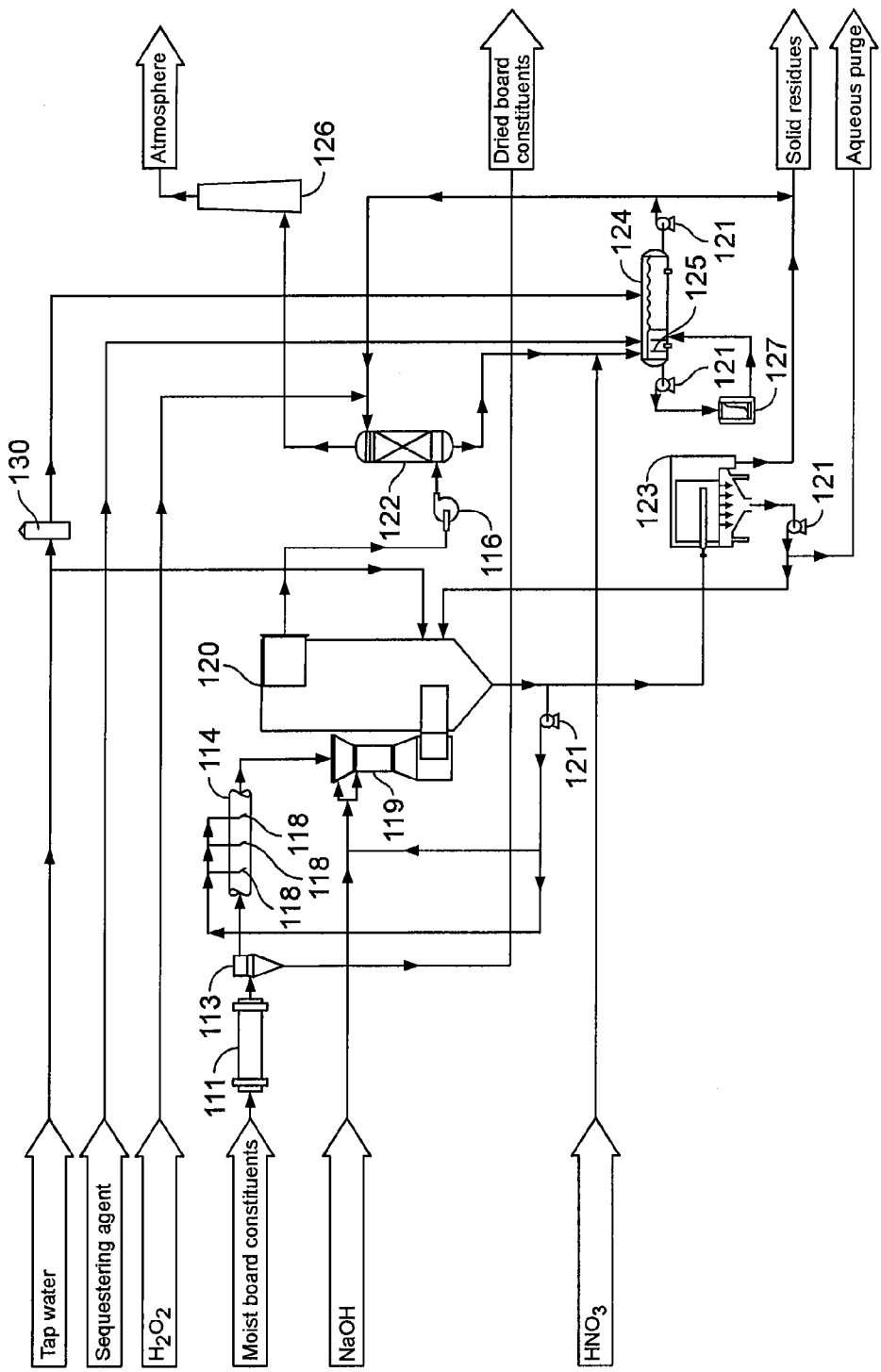
FIG. 3 is a schematic representation illustrating how is carried out a method according to another example of the present disclosure.

As it can be seen from FIG. 3, such a process is similar to the one illustrated in FIG. 2. However, in the case of the process shown in FIG. 3, the gas is captured from a dryer used in the wood-based panel industry. In fact, in the process of FIG. 3, moist board constituents (such as a moist mixture comprising wood fibers, a resin, and paraffin) are heated in a dryer (111) so as to remove water therefrom and to obtain dried board constituents. Such dried constituents can then be used in the manufacture of a panel. When heated in the dryer, the mixture of the board constituents, releases a gas containing VOCs (for example methanol and formaldehyde) and other impurities such as particulate material (for example wood particles). The gas is thus captured in the dryer (111) and then drawn and circulated by means of an air flow generated by a fan (116), through the whole process. The gas then passes through a cyclonic separator (113) so as to remove and recuperate dried board constituents contained therein. The gas is collected by a duct (114) provided with a plurality of spray nozzles (118). To avoid fouling inside the duct (114), an alkaline aqueous composition is spayed therein by means of the nozzles (118). Such a sprayed composition permits to saturate the gas with water and at the same time, decrease its temperature. Since the gas is hot and saturated, water condensation is favorized. A mixture comprising a solid phase, a liquid phase and a gaseous phase is generally obtained in the duct (114).

After having been quenched with the alkaline composition in a venturi-type device (119) used for cleaning gases, the gas is further treated before oxidizing VOCs contained therein. In fact, the so-obtained mixture is treated via a wet scrubber or three-phase-separator (120), so as to individually separate each phase. Therefore, a considerable amount of the remaining impurities is removed from the gas. The solid phase is then treated by means of a rotary filter (123), and the liquid phase can be recirculated, by means of a pump (121), into the spray nozzles (118) or in the three-phase-separator (120). When the liquid phase is recirculated in the separator (120) some more NaOH can be added thereto. After the treatment of the solid phase in the rotary filter (123), solid residues and an aqueous purge are obtained. These residues and the purge can be combined with the other similar waste products generated during the whole process. The aqueous portion obtained from the filter (123) can be further recirculated in the separator (120).

The gas, for which a considerable amount of impurities is efficiently removed, goes then to an absorption tower (122) via the action of the fan (116). In the tower (122), the gas and an aqueous acidic oxidizing composition, previously prepared in the reaction tank (124), are contacted together so as to enhance dissolution of VOCs in the oxidizing composition and therefore their oxidation rates into reaction products.

Prior to contact the gas in the tower, the composition was previously prepared in the tank (124) by adding and mixing therein treated water (130), an acid (for example $HNO_3$), a metal catalyst (for example Fe) and a sequestering agent (for example oxalic acid). The treatment device (130) can be used for demineralising water.

After being prepared in the tank (124), the composition is brought to an upper part of tower (122) by means of a pump (121). Before the composition reaches the tower (122), an oxidizing agent, $H_2O_2$, is added in the composition. The composition entering in the first compartment of the reaction tank (124) is filtered (127) by use of a pump (121) to remove suspended solids that shall be caught by the absorption tower (122). The composition is then returned to the second compartment of the reaction tank (124) where UV lamps (125) are installed. Thus, the so-obtained composition reacts, in the presence of UV emitted by UV lamps (125) in the tank (124), with at least one water soluble volatile organic compound to at least oxidize it partially, thereby reducing the amount of volatile organic compounds present in the gas. The pH in the tank (124) can be maintained at a pH of about 1.8 to 3.2. The composition is thus continuously recirculated into the tower (122).

Similarly to what has been described for FIG. 2, after a predetermined time, a portion of the oxidizing composition in the tank (124) can be purged towards the aqueous purge by means of a pump (121). Therefore, in order to replace such an amount of purged oxidizing composition, some more treated water, acid, metal catalyst and sequestering agent can be added to the tank (124). Some more $H_2O_2$ can also be added.

Finally, the gas then leaves the absorption tower (122) so as to go to a chimney (126) by use of the fan (116).

The following examples are presented in a non-limitative manner.

Example 1

Reducing the Formaldehyde and Methanol Content of a Gas Stream at Laboratory Scale On a laboratory scale system which is similar to the one represented on FIG. 2, several tests have been conducted. A gas having an air flow rate of 80 liters/minute and a concentration of about 100 mg/m$^3$ of formaldehyde and about 55 mg/m$^3$ of methanol was treated. An absorption tower filled with stainless steel random packing and a glass reaction flask were used at temperature of about 35° C. to about 55° C. The number of transfer units in the absorption tower was estimated at 7.

In the various tests, the reaction was carried out at a pH of about 1.8 to about 3.2. The pH was controlled by the addition of nitric acid. In one embodiment, the experiments were carried out at a pH of about 1.8 to 2.2. A sequestering agent, for example oxalic acid, was added to demineralised water to obtain a molar ratio sequestering agent:metal catalyst ($Fe^{2+}$ obtained from $FeSO_4$) of about 2:1 to about 6:1. According to one embodiment, the ratio was about 4:1. The metal catalyst concentration ($Fe^{2+}$ ions) was about 10 mg/L to about 50 mg/L or about 30 mg/L to about 50 mg/L. The person skilled in the art would understand that various other sources of $Fe^{2+}$ can be used and that the nature of such a source will considerably be influenced by the cost of the source of $Fe^{2+}$ especially when the method is used on a large scale or industrial production. For example, the source of $Fe^{2+}$ can also be $FeCl_2$, $FeBr_2$, $FeI_2$, $FeF_2$, ferrous fumarate (Fe(OOCCHCHCOO), ferrous oxalate (Fe(OOCCOO)), etc. The glass flask had a residence time of about 20 minutes and has been modified to mount on the bottom a 254 nm and 9 watts UV lamp which supplies energy so as to promote the oxidation reaction at an energy of about 43500 kJ/kg of pollutants (mixture of formaldehyde and methanol). Hydrogen peroxide ($H_2O_2$) was added to obtain a residual concentration of $H_2O_2$ (at the outlet of the reaction tank) which corresponds to a $H_2O_2$:metal catalyst ratio of about 6:1 to about 140:1 or about 10:1 to about 40:1.

Such tests permitted a formaldehyde removal as high as 99.4% and a methanol removal as high as 97.8% based on the content in the inlet gas stream.

Example 2

Reducing the Formaldehyde and Methanol Content of a Gas Stream Coming from a Particle Board Dryer Several tests were made on a pilot scale system, which is similar to the system represented on FIG. 3. A gas having an air flow rate of about 2000 m$^3$/h and having a concentration in formaldehyde of about 30 mg/m$^3$ to about 160 mg/m$^3$ and in methanol of about 10 mg/m$^3$ to about 50 mg/m$^3$ at a temperature of about 35° C. to about 55° C. was treated. The pH was controlled by the use of nitric acid at a value of about 1.9 to 2.8. In one embodiment, the pH was about 2.2 to about 2.6. A sequestering agent, for example oxalic acid, was added to demineralised water to obtain a molar ratio sequestering agent:metal catalyst ($Fe^{2+}$ obtained from $FeSO_4$) of about of about 2:1 to about 6:1. According to one embodiment, the ratio was about 4:1. The metal catalyst concentration was about 20 mg/L to about 25 mg/L ($Fe^{2+}$ ions). The reaction tank had a residence time of about 20 minutes. This reaction tank was composed of 6 compartments in which the residence time is about 3 minutes in each of them.

6 UV lamps with wavelength of 254 nm were immersed in the water of the second compartment where the oxidation mainly occurred at an energy of about 4140 to about 21420 kJ/kg of pollutants (mixture of formaldehyde and methanol). The total power of the UV lamps was 465 Watts. $H_2O_2$ was added to obtain a residual concentration of $H_2O_2$ at the outlet of the reaction tank which corresponds to a $H_2O_2$:metal catalyst of about 10:1 to about 100:1 or about 12:1 to about 40:1.

Such tests permitted a formaldehyde removal as high as 99.5% and methanol removal as high as 97.3%.

Example 3

Reducing the Formaldehyde and Methanol Content of a Gas Stream Coming from a MDF Board Dryer Several tests were made on a pilot scale system, which is similar to the system represented on FIG. 3. A gas having an air flow rate of about 1275 m$^3$/h and having a concentration in formaldehyde of about 82 mg/Nm$^3$ with a standard deviation of about 23.9 mg/Nm$^3$ and in methanol of 92 mg/Nm$^3$ with a standard deviation of about 22.1 mg/Nm$^3$ at a temperature of about 60° C. was treated. The pH was controlled by the use of nitric acid at a value of about 1.9 to 2.8. In one embodiment, the pH was about 2.2 to about 2.6. A sequestering agent, for example oxalic acid, was added to demineralised water to obtain a molar ratio sequestering agent:metal catalyst ($Fe^{2+}$ obtained from $FeSO_4$) of about of about 2:1 to about 6:1. According to one embodiment, the ratio was about 4:1. The metal catalyst concentration was about 20 mg/L to about 25 mg/L ($Fe^{2+}$ ions). The reaction tank had a residence time of about 20 minutes. This reaction tank was composed of 6 compartments in which the residence time is about 3 minutes in each of them.

3 to 5 UV lamps with wavelength of 254 nm were immersed in the water of the second compartment where the oxidation mainly occurred at an energy of about 5400 to about 9000 kJ/kg of pollutants (mixture of formaldehyde and methanol). $H_2O_2$ was added to obtain a residual concentration of $H_2O_2$ at the outlet of the reaction tank which corresponds to a $H_2O_2$:metal catalyst of about 10:1 to about 100:1 or about 12:1 to about 40:1.

Such tests permitted a formaldehyde mean removal of 92.6% with a standard deviation of 2.4% and methanol mean removal of 97.3% with a standard deviation of 3.4%.

Example 4

(Comparative Example) Reducing the Formaldehyde and Methanol Content of a Gas Stream Coming from a MDF/HDF Board Dryer Using Prior Art Technology A comparative example has been made in order to compare the results obtained using the technology described in the present document and the technology described in WO2007/041831, which is hereby incorporated by reference in its entirety. Several tests were made on a pilot scale system, which is similar to the system schematically represented on FIG. 2 of WO2007/041831. A gas having an air flow rate of about 2000 Nm$^3$/h and having a concentration of about 20 mg/Nm$^3$ in formaldehyde and of about 99 mg/Nm$^3$ in methanol at a temperature of 48° C. was treated. The base used was NaOH at various pH between 9.5 to and 10.5 and for example at 9.8. A sequestering agent, NTA, was added to tap water to obtain a concentration of about 4 ppm to about 20 ppm in the oxidizing solution. The tap water was treated by adding thereto Fe$^{2+}$ ions (obtained from FeSO$_4$) at a concentration of about 1 to about 5 ppm.

The tank had a residence time sufficiently long (for example about 20 minutes) to obtain a good reaction conversion of formaldehyde into formic acid in its salt form (sodium salt). H$_2$O$_2$, was added, as shown on FIG. 4 so as to obtain a residual concentration of H$_2$O$_2$ at the outlet of the reaction tank of approximately 10 ppm to 75 ppm and for example about 10 ppm. The absorption tower had about 2.4 transfer.

Such tests permitted a formaldehyde removal as high as 77.0% based on the emission of formaldehyde at the dryer. The methanol removal was not significant i.e. less than 2%. It was thus shown that the technology described in WO2007/041831, for example in FIG. 2, was not efficient for removing methanol from a gas stream. In fact, the technology described in WO2007/041831 and tested in Example 4 failed to be effective for oxidizing methanol.

The present disclosure has been described with regard to specific examples. The description was intended to help the understanding of the disclosure, rather than to limit its scope. It will be apparent to one skilled in the art that various modifications may be made to the disclosure without departing from the scope of the disclosure as described herein, and such modifications are intended to be covered by the present document.

The invention claimed is:

1. A method for reducing content of at least one water soluble volatile organic compound present in a gas, said method comprising:
contacting said gas with an aqueous acidic oxidizing composition comprising H$_2$O$_2$ and a metal catalyst in an absorption tower so as to at least partially dissolve said at least one water soluble volatile organic compound in said aqueous acidic oxidizing composition, said gas being introduced at a lower portion of said absorption tower and said aqueous acidic oxidizing composition being introduced at an upper portion of said absorption tower, said absorption tower being in fluid flow communication with a reactor tank disposed below said absorption tower; and
maintaining pH of said aqueous acidic oxidizing composition at a value of about 2.2 to about 2.6 within said reactor tank and recirculating said aqueous acidic oxidizing composition through said absorption tower, and submitting said at least one water soluble volatile organic compound and said aqueous acidic oxidizing composition to an UV radiation within said reactor tank by means of UV lamps disposed within said reactor tank, wherein said at least one water soluble volatile organic compound present in said gas is chosen from methanol, ethanol, aldehydes, ketones, organic acids, esters, and mixtures thereof.

2. The method of claim 1, wherein said metal catalyst comprises a metal chosen from Fe, Cu, Ni, Mn, Ti, Cr, Ce, Zn, Pd, Mo, and mixtures thereof.

3. The method of claim 2, wherein said at least one water soluble volatile organic compound is chosen from methanol, ethanol, and aldehydes.

4. The method of claim 2, wherein said UV radiation has an energy of about 4000 to about 22000 kJ per kg of said at least one water soluble volatile organic compound contained in the gas.

5. The method of claim 1, wherein said metal catalyst comprises Fe$^{2+}$ ions.

6. The method of claim 5, wherein said composition further comprises a sequestering agent that is oxalic acid.

7. The method of claim 6, wherein said at least one water soluble volatile organic compound is methanol.

8. The method of claim 5, wherein the metal catalyst concentration is at least 5 mg/L based on the total volume of the composition.

9. The method of claim 5, wherein said gas comprises methanol and formaldehyde.

10. The method of claim 5, wherein said aqueous acidic oxidizing composition comprises HNO$_3$.

11. The method of claim 5, wherein said UV radiation has an energy of at least 4000 kJ per kg of said at least one water soluble volatile organic compound contained in the gas.

12. The method of claim 11, wherein said method is effective for reducing at least about 90% of the content of said at least one water soluble volatile organic compound present in said gas.

13. The method of claim 5, wherein said composition further comprises a sequestering agent chosen from oxalic acid, citric acid, ethylenediaminetetraacetic acid, glycine, nitrilotriacetic acid, salicylic acid, sulfosalicylic acid, triethylenetetramine, and mixtures thereof.

14. The method of claim 1, wherein said composition further comprises a sequestering agent chosen from oxalic acid, citric acid, ethylenediaminetetraacetic acid, glycine, nitrilotriacetic acid, salicylic acid, sulfosalicylic acid, triethylenetetramine, and mixtures thereof.

15. The method of claim 1, wherein the molecular ratio H$_2$O$_2$:metal catalyst is at least 10:1.

16. The method of claim 1, wherein said at least one water soluble volatile organic compound is chosen from methanol, formaldehyde, ethanol, acetaldehyde, acrolein, acetic acid, formic acid, ethyl acetate, and mixtures thereof.

17. The method of claim 1, wherein said at least one water soluble volatile organic compound is methanol.

18. The method of claim 1, wherein contacting said gas with said aqueous acidic oxidizing composition comprising H$_2$O$_2$ and a metal catalyst in said absorption tower is carried out in absence of UV radiation.

19. The method of claim 1, wherein submitting said at least one water soluble volatile organic compound and said aqueous acidic oxidizing composition to an UV radiation within said reactor tank by means of UV lamps disposed within said reactor tank is carried out in absence of ozone.

20. A method for using an aqueous acidic oxidizing composition comprising contacting an aqueous acidic oxidizing composition comprising H$_2$O$_2$, a metal catalyst, and a sequestering agent chosen from oxalic acid, citric acid, ethylenediaminetetraacetic acid, glycine, nitrilotriacetic acid, salicylic acid, sulfosalicylic acid, triethylenetetramine, and mixtures thereof, with a gas comprising at least one water soluble volatile organic compound so as to reduce a content of said at least one water soluble volatile organic compound in said gas, wherein said method comprises mixing said gas with said aqueous acidic oxidizing composition in an absorption tower free of UV lamps so as to at least partially dissolve said at least one water soluble volatile organic compound in said aqueous acidic oxidizing composition and to obtain a mixture, said absorption tower being in fluid flow communication with a reactor tank; submitting said mixture to UV radiation generated by UV lamps disposed inside said reaction tank, maintaining pH of said mixture, in said tank, at a value of about 2.2 to about 2.6, recirculating said mixture through said absorption tower, and wherein said at least one water soluble volatile organic compound present in said gas is chosen from methanol, ethanol, aldehydes, ketones, organic acids, esters, and mixtures thereof.

21. The method of claim 20, wherein said metal catalyst comprises a metal chosen from Fe, Cu, Ni, Mn, Ti, Cr, Ce, Zn, Pd, Mo, and mixtures thereof.

22. The method of claim 20, wherein said metal catalyst comprises $Fe^{2+}$ ions.

23. The method of claim 22, wherein the sequestering agent is oxalic acid.

24. The method of claim 23, wherein said at least one water soluble volatile organic compound is methanol.

25. The method of claim 20, wherein the sequestering agent is oxalic acid.

26. The method of claim 20, wherein said gas comprises methanol and formaldehyde.

27. A method for reducing content of at least one water soluble volatile organic compound present in a gas, said method comprising contacting said gas with an aqueous acidic oxidizing composition comprising $H_2O_2$ and a metal catalyst in an absorption tower so as to at least partially dissolve said at least one water soluble volatile organic compound in said aqueous acidic oxidizing composition, said gas being introduced at a lower portion of said absorption tower and said aqueous acidic oxidizing composition being introduced at an upper portion of said absorption tower, said absorption tower being in fluid flow communication with a reactor tank disposed below said absorption tower; and maintaining pH of said aqueous acidic oxidizing composition at a value of about 1.8 to about 2.2 within said reactor tank and recirculating said aqueous acidic oxidizing composition through said absorption tower, and submitting said at least one water soluble volatile organic compound and said aqueous acidic oxidizing composition to an UV radiation within said reactor tank by means of UV lamps disposed within said reactor tank, wherein said at least one water soluble volatile organic compound present in said gas is chosen from methanol, ethanol, aldehydes, ketones, organic acids, esters, and mixtures thereof.

28. The method of claim 27, wherein said metal catalyst comprises a metal chosen from Fe, Cu, Ni, Mn, Ti, Cr, Ce, Zn, Pd, Mo, and mixtures thereof.

29. The method of claim 27, wherein said metal catalyst comprises $Fe^{2+}$ ions.

30. The method of claim 29, wherein said composition further comprises a sequestering agent chosen from oxalic acid, citric acid, ethylenediaminetetraacetic acid, glycine, nitrilotriacetic acid, salicylic acid, sulfosalicylic acid, triethylenetetramine, and mixtures thereof.

31. The method of claim 29, wherein said composition further comprises a sequestering agent that is oxalic acid.

32. The method of claim 27, wherein contacting said gas with said aqueous acidic oxidizing composition comprising $H_2O_2$ and a metal catalyst in said absorption tower is carried out in absence of UV radiation.

33. The method of claim 27, wherein said absorption tower is free of silica and quartz.

34. The method of claim 27, wherein submitting said at least one water soluble volatile organic compound and said aqueous acidic oxidizing composition to an UV radiation within said reactor tank by means of UV lamps disposed within said reactor tank is carried out in absence of ozone.

* * * * *